US009451360B2

(12) United States Patent
Bao et al.

(10) Patent No.: US 9,451,360 B2
(45) Date of Patent: Sep. 20, 2016

(54) MUTING A SOUND SOURCE WITH AN ARRAY OF MICROPHONES

(71) Applicant: CISCO TECHNOLOGY, INC., San Jose, CA (US)

(72) Inventors: Feng Bao, Sunnyvale, CA (US); Subrahmanyam Kunapuli, Fremont, CA (US); Fei Yang, San Jose, CA (US); Tor Sundsbarm, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 14/154,975

(22) Filed: Jan. 14, 2014

(65) Prior Publication Data

US 2015/0201278 A1 Jul. 16, 2015

(51) Int. Cl.
H04R 3/00 (2006.01)
H04M 3/56 (2006.01)
H04N 7/15 (2006.01)

(52) U.S. Cl.
CPC ............ *H04R 3/005* (2013.01); *H04M 3/568* (2013.01); *H04N 7/15* (2013.01)

(58) Field of Classification Search
CPC H04R 3/005; H04R 1/406; H04R 2201/401; H04R 2201/403; H04R 25/407
USPC ......... 381/74, 71.6, 92; 340/10.1; 348/14.07
See application file for complete search history.

(56) References Cited

U.S. PATENT DOCUMENTS

| 6,243,471 | B1 * | 6/2001 | Brandstein | G01V 1/001 |
|---|---|---|---|---|
| | | | | 348/169 |
| 7,843,486 | B1 * | 11/2010 | Blair | H04M 3/568 |
| | | | | 348/14.01 |
| 2002/0141595 | A1 * | 10/2002 | Jouppi | H04R 3/005 |
| | | | | 381/2 |
| 2005/0093970 | A1 * | 5/2005 | Abe | H04N 7/15 |
| | | | | 348/14.05 |
| 2006/0245601 | A1 * | 11/2006 | Michaud | G01S 5/22 |
| | | | | 381/92 |
| 2007/0016426 | A1 | 1/2007 | Hershey et al. | |

(Continued)

FOREIGN PATENT DOCUMENTS

| JP | 2006180039 A | 7/2006 |
|---|---|---|
| WO | WO 2013/025373 A1 | 2/2013 |

OTHER PUBLICATIONS

International Search Report and Written Opinion, from PCT/US2015/010957, Nov. 26, 2015, WO.

(Continued)

*Primary Examiner* — Simon Sing
(74) *Attorney, Agent, or Firm* — Lempia Summerfield Katz LLC

(57) ABSTRACT

A processing system can include tracking microphone array(s), audio-tracking circuitry configured to detect a location of audio sources from audio signals from the array(s), and processing circuitry. The processing circuitry can be configured to: identify a first microphone that has a strongest signal strength; estimate a location of an active speaker based on at least an output of the audio-tracking circuitry; determine whether a second microphone for the active speaker is affected by an acoustic obstacle based on the location of the active speaker and a location of the first microphone that has the strongest signal strength; estimate attenuation for microphones based on a comparison of actual signal strengths of the microphones with estimated signal strengths of the microphones that are estimated based on microphone signals of the second microphone for the active speaker; and modify the attenuation based on an estimated location of the acoustic obstacle.

19 Claims, 9 Drawing Sheets

(56) References Cited

U.S. PATENT DOCUMENTS

| | | |
|---|---|---|
| 2008/0174665 A1 | 7/2008 | Enstad et al. |
| 2009/0322559 A1* | 12/2009 | Yen ..................... G08G 1/0965 340/901 |
| 2011/0082690 A1* | 4/2011 | Togami ................. H04R 1/406 704/201 |
| 2011/0135102 A1* | 6/2011 | Huang ................... G06T 7/004 381/58 |
| 2013/0044893 A1* | 2/2013 | Mauchly ............... H04M 3/568 381/92 |
| 2013/0271559 A1* | 10/2013 | Feng ..................... H04N 7/142 348/14.08 |

OTHER PUBLICATIONS

Wang, et al., "Robust Automatic Video-Conferencing wih Multiple Cameras and Microphones", Multimedia and Expo, 2000 ICME 2000, Jul. 30, 2000.

\* cited by examiner

MUTING A SOUND SOURCE WITH AN ARRAY OF MICROPHONES

TECHNICAL FIELD

This application relates generally to muting a sound source, including muting a sound source in video conferencing devices/systems that utilize an array of microphones.

BACKGROUND

US Patent Application Publication No. 2013/0044893 (U.S. patent application Ser. No. 13/136,990, filed Aug. 16, 2011), which is incorporated herein by reference in its entirety, describes receiving audio at a plurality of microphones, identifying a sound source to be muted, processing the audio to remove sound received from the sound source at each of the microphones, and transmitting the processed audio.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DESCRIPTION OF EXAMPLE EMBODIMENTS

Overview

Figure 1:
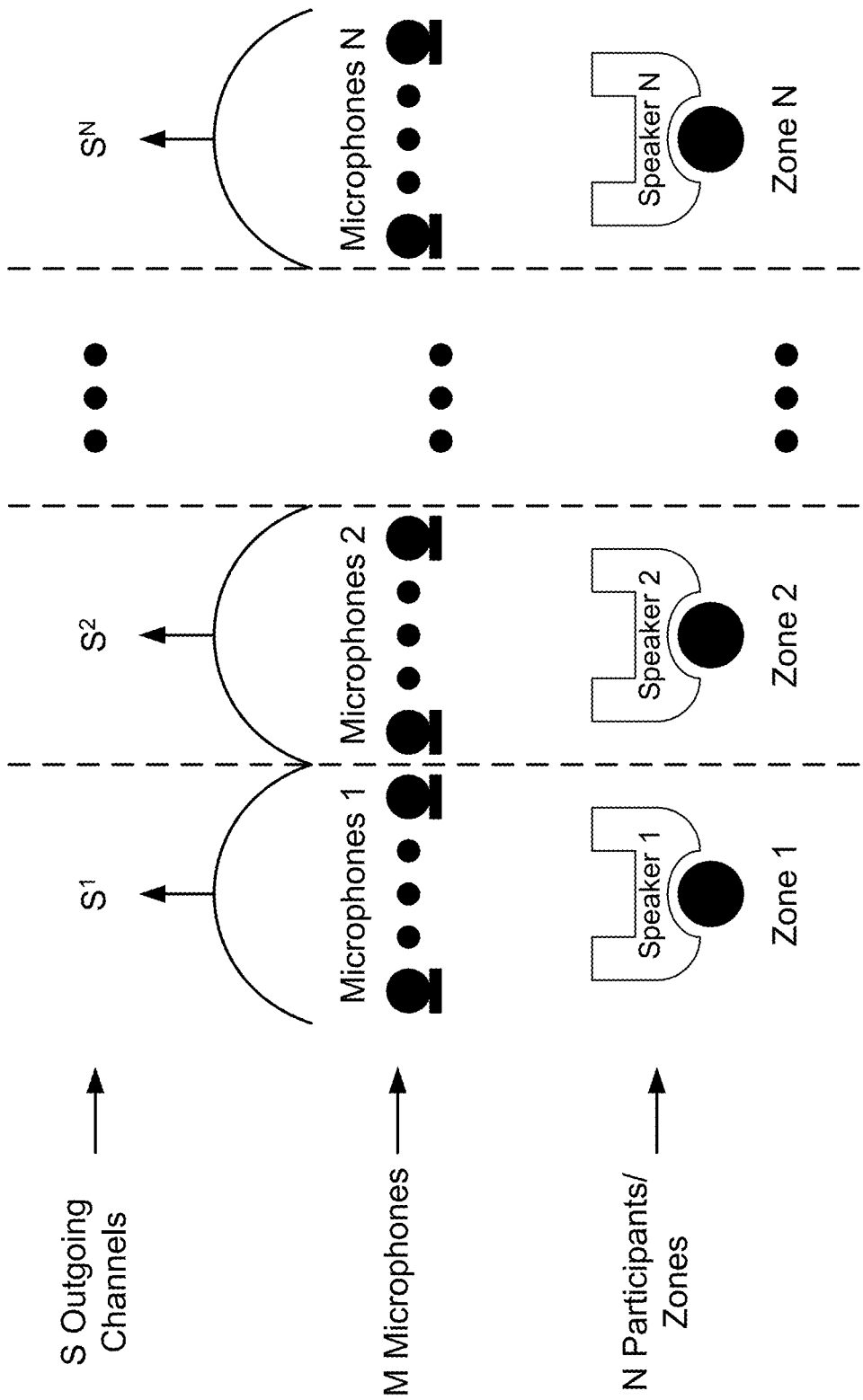
FIG. 1 is a schematic illustration of multi-array conference system that accommodates multiple speakers.

In one exemplary implementation, a procedure can include a plurality of steps, including identifying a first microphone, from a plurality of microphones, that has a strongest signal strength. A location of an active speaker can be estimated, and a determination can be made as to whether a second microphone, of the plurality of microphones, for the active speaker is affected by an acoustic obstacle based on the location of the active speaker and a location of the first microphone that has the strongest signal strength. Attenuation for one or more of the microphones can be estimated based on a comparison of actual signal strengths of the microphones with estimated signal strengths of the microphones, which can be estimated based on microphone signals of the second microphone for the active speaker. The attenuation can be modified based on an estimated location of the acoustic obstacle.

DETAILED DESCRIPTION OF EXEMPLARY IMPLEMENTATIONS

In the drawings, like reference numerals designate identical or corresponding parts throughout the several views. Further, as used herein, the words "a," "an" and the like generally carry a meaning of "one or more," unless stated otherwise.

Aspects of this disclosure relate to video conferencing systems and telepresence systems. However, the teachings of this disclosure are not limited to such systems.

Video conferencing and telepresence systems may include a codec. A codec is coder-decoder that processes data, especially digital data. In the case of video conference and telepresence systems, the codec codes and decodes audio and video data. Raw audio and video data may include digital or analog signals. The codec can process or code the analog signals into digital signals.

The codec can be implemented by one or more processors or circuits, and the processors or circuits can be distributed or centrally located in a single device. The codec can also include mute/unmute circuitry for one or more microphones connected thereto for primary audio communication. The codec can also include audio-tracking (i.e., source-tracking or speaker-tracking) circuitry to detect audio sources from audio signals from one or more microphones or microphone arrays.

A teleconference or video conference system can utilize array microphones in meetings with multiple participates, where sometimes one talker (i.e., one speaker) may want to have a private, side conversation within the room and not to be heard by remote participants without muting the entire room. All of the microphones in the room pick up a speech signal from the talker (sometimes referred to as a speaker). As long as a signal of any microphone in the room is sent out as is, the talker's speech will be leaked to remote sites (i.e., to other participants not involved in the private, side conversation). Conventional audio systems can either mute or not mute all of the microphones in the room, and are not able to mute selected talkers in the room. Aspects of this disclosure address this issue.

Aspects of this disclosure are directed to sound-source based muting, utilizing an array of microphones, and enabling the muting of sound sources independently. Aspects of this disclosure are also directed to allowing sound from unmuted talkers to be sent without (or minimal) distortion and preventing (or minimizing) leakage of a speech signal of a muted talker to remote sites.

A proposed implementation in accordance with this disclosure is robust to a complicated acoustic environment of a typical teleconference and video conference meeting room, where obstacles such as laptops, tablets and user interface devices may block microphones and in some cases where the talker may not be facing the microphones in front of him.

In accordance with the following descriptions of exemplary implementations, algorithms for sound-source muting with an array of microphones are proposed. By the algorithms, one or more talkers in a room can be muted independently, allowing meeting participants to have a private, side conversation while in a teleconference. The exemplary algorithms are robust to accommodate the complicated acoustic environments of a typical teleconference room, taking into consideration obstacles that block microphones or talkers talking to one side (i.e., not directly at a microphone).

In US Patent Application Publication No. 2013/0044893, a concept of sound-source muting is described. Sound-source muting can be accomplished by blind sound-source separation with a microphone array or speech-signal cancellation. Blind sound-source separation with a microphone array requires high computation power, may distort a speech signal from unmuted zones, and a muted speech signal may still leak to remote side. Speech-signal cancellation also requires high computation power, and is sensitive to the acoustic environment. In some cases, an adaptive filter used in the signal cancellation may even enhance a muted signal instead of canceling the muted signal. In accordance with the exemplary implementations of this disclosure, proposed algorithms and systems require low computation power, are robust to complicated acoustic environments, maintain good sound quality of unmuted signals, and provide no leakage or substantially eliminate leakage of muted speech.

In one implementation, a processor includes circuitry configured to: identify a first microphone, from a plurality of microphones, that has a strongest signal strength; estimate a location of an active speaker; determine whether a second microphone, of the plurality of microphones, for the active speaker is affected by an acoustic obstacle based on the location of the active speaker and a location of the first microphone that has the strongest signal strength; estimate attenuation for one or more of the microphones based on a comparison of actual signal strengths of the microphones with estimated signal strengths of the microphones, wherein the estimated signal strengths are estimated based on microphone signals of the second microphone for the active speaker; and modify the attenuation based on an estimated location of the acoustic obstacle.

The circuitry can be further configured to: identify a microphone, from the microphones, that has a strongest signal strength at a high frequency; and estimate the location of the acoustic obstacle based on a comparison of signal strengths of the microphones at the high frequency with a high-frequency reference calibration of the microphones with an active speaker at the high frequency.

The circuitry can be configured to estimate the estimated signal strengths based on the microphone signals at a full-range of frequencies of the second microphone for the active speaker and a full-range reference calibration of the microphones with an active speaker at the full-range of frequencies.

The full-range reference calibration can be a relative signal level matrix (RSLM) that stores relative signal levels of the microphones with an active speaker at the full-range of frequencies.

The circuitry can be configured to generate the RSLM by measuring relative signal strengths of the microphones at the full-range of frequencies with one or more known active speakers without obstacles and store the RSLM in a memory.

The relative signal levels of the microphones of the RSLM can be based on microphone distances and are estimated by the circuitry statistically according to acoustic characteristics of an environment that includes the microphones and only one active speaker.

The high-frequency reference calibration of the microphones with an active speaker can be a relative signal level matrix-high frequency (RSLM-H) that stores relative signal levels of the microphones with an active speaker at the high frequency.

The relative signal levels of the microphones of the RSLM-H can be estimated by the circuitry statistically according to acoustic characteristics of an environment that includes the microphones and only one active speaker.

The circuitry can be configured to generate the RSLM-H by measuring relative signal strengths of the microphones at the high frequency with one or more known active speakers without obstacles and store the RSLM-H in a memory.

The high frequency can be about 2 kHz or higher.

The circuitry can be further configured to determine whether the active speaker is in a muted zone, and estimate the attenuation based on whether the active speaker is in the muted zone.

The circuitry can be further configured to apply the modified attenuation to microphone signals of one or more of the microphones in one or more unmuted zones.

The circuitry can be further configured to package audio signals based on the microphone signals after the modified attenuation has been applied and transmit the packaged audio signals to a remote device.

The circuitry can be further configured to: package audio signals based on microphone signals of one or more of the microphones in one or more unmuted zones, separately package attenuation data with data corresponding to the modified attenuation, and transmit the packaged audio signals and the separately packaged attenuation data to a remote device.

The circuitry can be further configured to: receive images from one or more cameras; identify the acoustic obstacle in the images; and generate the estimated location of the acoustic obstacle from the images.

In one implementation a processing system, such as a telepresence processing system, can include: one or more tracking microphone arrays, audio-tracking circuitry configured to detect a location of audio sources from audio signals from the one or more tracking microphone arrays, and processing circuitry. The processing circuitry can be configured to identify a first microphone, from a plurality of microphones, that has a strongest signal strength; estimate a location of an active speaker based on at least an output of the audio-tracking circuitry; determine whether a second microphone, of the plurality of microphones, for the active speaker is affected by an acoustic obstacle based on the location of the active speaker and a location of the first microphone that has the strongest signal strength; estimate attenuation for one or more of the microphones based on a comparison of actual signal strengths of the microphones with estimated signal strengths of the microphones, wherein the estimated signal strengths are estimated based on microphone signals of the second microphone for the active speaker; and modify the attenuation based on an estimated location of the acoustic obstacle.

The processing system can further include a network transmitter. The processing circuitry can be configured to apply the modified attenuation to microphone signals of one or more of the microphones in one or more unmuted zones, and package audio signals based on the microphone signals after the modified attenuation has been applied, and the network transmitter can be configured to transmit the packaged audio signals to a remote device.

The processing system can further include one or more cameras to capture video of at least the active speaker. The processing circuitry can be configured to package video signals based on an output of the one or more cameras, and the network transmitter can be configured to transmit the packaged video signals with the packaged audio signals to a remote device.

In one exemplary implementation, a method includes: identifying, by circuitry, a first microphone, from a plurality of microphones, that has a strongest signal strength; estimating, by circuitry, a location of an active speaker; determining, by circuitry, whether a second microphone, of the plurality of microphones, for the active speaker is affected by an acoustic obstacle based on the location of the active speaker and a location of the first microphone that has the strongest signal strength; estimating, by circuitry, attenuation for one or more of the microphones based on a comparison of actual signal strengths of the microphones with estimated signal strengths of the microphones, wherein the estimated signal strengths are estimated based on microphone signals of the second microphone for the active speaker; and modifying, by circuitry, the attenuation based on an estimated location of the acoustic obstacle.

A non-transitory computer-readable medium including computer-executable instructions that, when executed by computer processor, can cause the computer processor to execute the method. Steps of the method or a corresponding computer process can be executed by various means, including encoding, converting, decoding, processing, transmitting, and receiving means that correspond to computer hardware components or computer hardware components that are configured by computer software or computer code.

FIG. 1 illustrates an audio system with M microphones and S outgoing audio signal streams (i.e., audio channels), where S<M. The audio system is divided into N sound zones, and an outgoing audio stream, e.g., $S^1$, is selected from amongst signals from the M microphones. For example, Microphones 1 (i.e., Microphone Array 1) in Zone 1, which can correspond to the Speaker 1, can output $S^1$ for Zone 1. Similar relationships can be established for $S^2$ to $S^N$, with respect to Zones 2 to N, Microphones 2 to N and Speakers 2 to N. Each of these sound zones can be muted independently by corresponding control processing circuitry. Muting can be accomplished by not including sound captured by the relevant microphone(s) in subsequent audio processing and transmitting to remote sites.

In this implementation, N is equal to or larger than S. That is, there can be more zones and/or participants than outgoing channels, and there can also be more zones and/or participants than microphone arrays. Each of the Microphone Arrays 1 to N preferably includes two or more microphones. However, in some implementations one or more of the arrays can be replaced with a single microphone, and more than 4 or 5 microphones can be included in some of the arrays.

All of the M microphones in a room receive speech signals from a talker/speaker through different acoustic paths. To correctly mute sound from one zone, and that zone only, sound originated from the muted zone has to be removed from all outgoing audio streams/channels.

In a typical teleconference/video conference meeting, obstacles between microphones and a talker or a talker turning his/her head to one side may cause a mismatch between a zone of talker position and a zone of a microphone with a strongest speech signal from the talker. When microphones are on a table, obstacles such as laptops, tablets, user interface devices, etc. affect the acoustic paths between microphones and a talker. If the microphones closest to the talker are blocked, then the signal strength of the microphones will be weaker than further away microphones that are not blocked.

In the following descriptions, examples of using a microphone array in each zone are presented, where each array includes three separate microphones. This is exemplary and for discussion purposes. The number of microphones in each array can be varied in other implementations.

Figure 2:
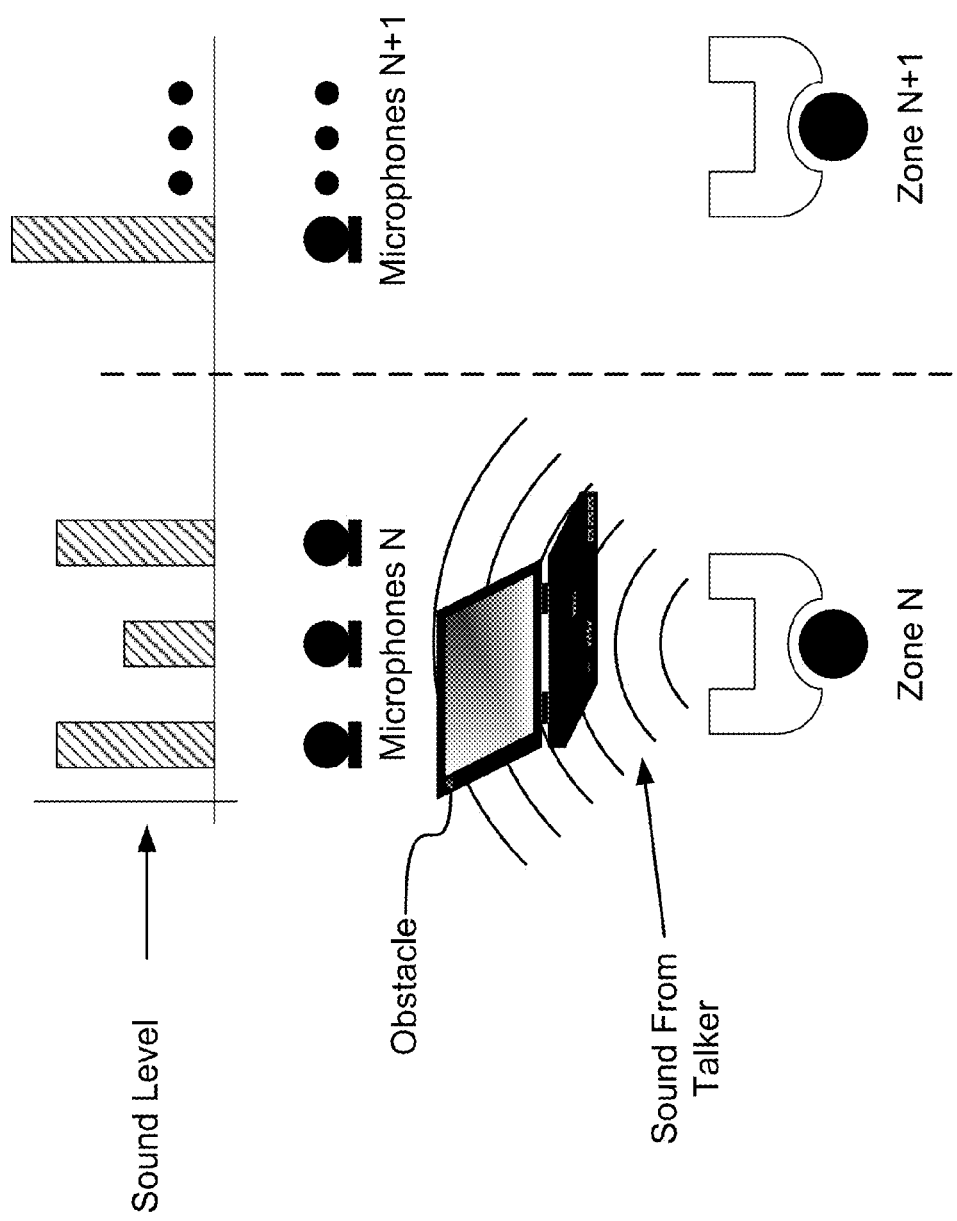
FIG. 2 is a schematic illustration of the system, where an obstacle is present between a speaker and a corresponding array.

FIG. 2 illustrates a case where there is an obstacle (i.e., a laptop) in front of a talker in Zone N that blocks the acoustic path of sound from the talker, between the Microphones N and the talker. The talker is in Zone N, but all of the microphones in Zone N receive weaker signals (as exemplified by the Sound Level bars in FIG. 2) than a microphone that is in adjacent Zone N+1 and not blocked. However, the person in the adjacent zone N+1 is not talking at the time.

Figure 3:
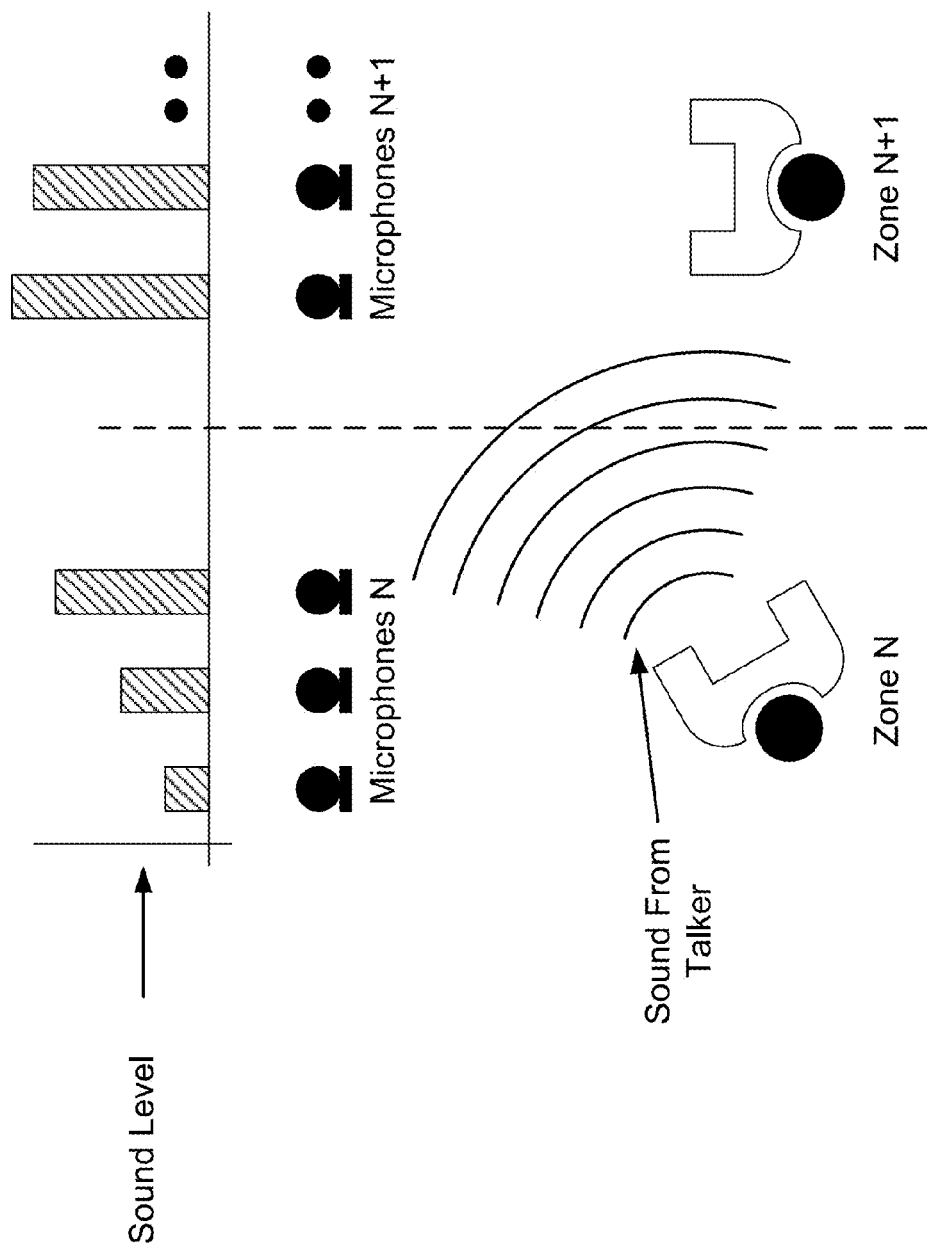
FIG. 3 is a schematic illustration of the system, where the speaker is directing sound to a side of the corresponding array, towards an adjacent array.

When the talker turns his head and talks to one side, microphones on that side tend to receive stronger signals than the microphone that is the closest to the talker. FIG. 3 illustrates such a case where a talker is turned to right while talking. The talker is in Zone N, but one of the microphones in Zone N+1 receives a strongest speech signal from the talker.

To mute a zone independently, array microphone processing estimates a zone of a primary talker first. A sound-source estimation algorithm for this purpose is robust for acoustic environments of a typical teleconference meeting room. A zone of an active talker is estimated accurately regardless of how many obstacles are on table or talking direction of the talker. That is, the cases illustrated in FIGS. 2-3 can be combined, where both an obstacle is present and the speaker is not directing sound directly at microphones in his zone.

Once the primary talker zone is estimated, a microphone with the strongest signal strength is identified. When there is only one talker in the room, other microphone signal levels relative to the strongest signal level will depend on the distances between the microphones and the primary microphone.

Figure 4:
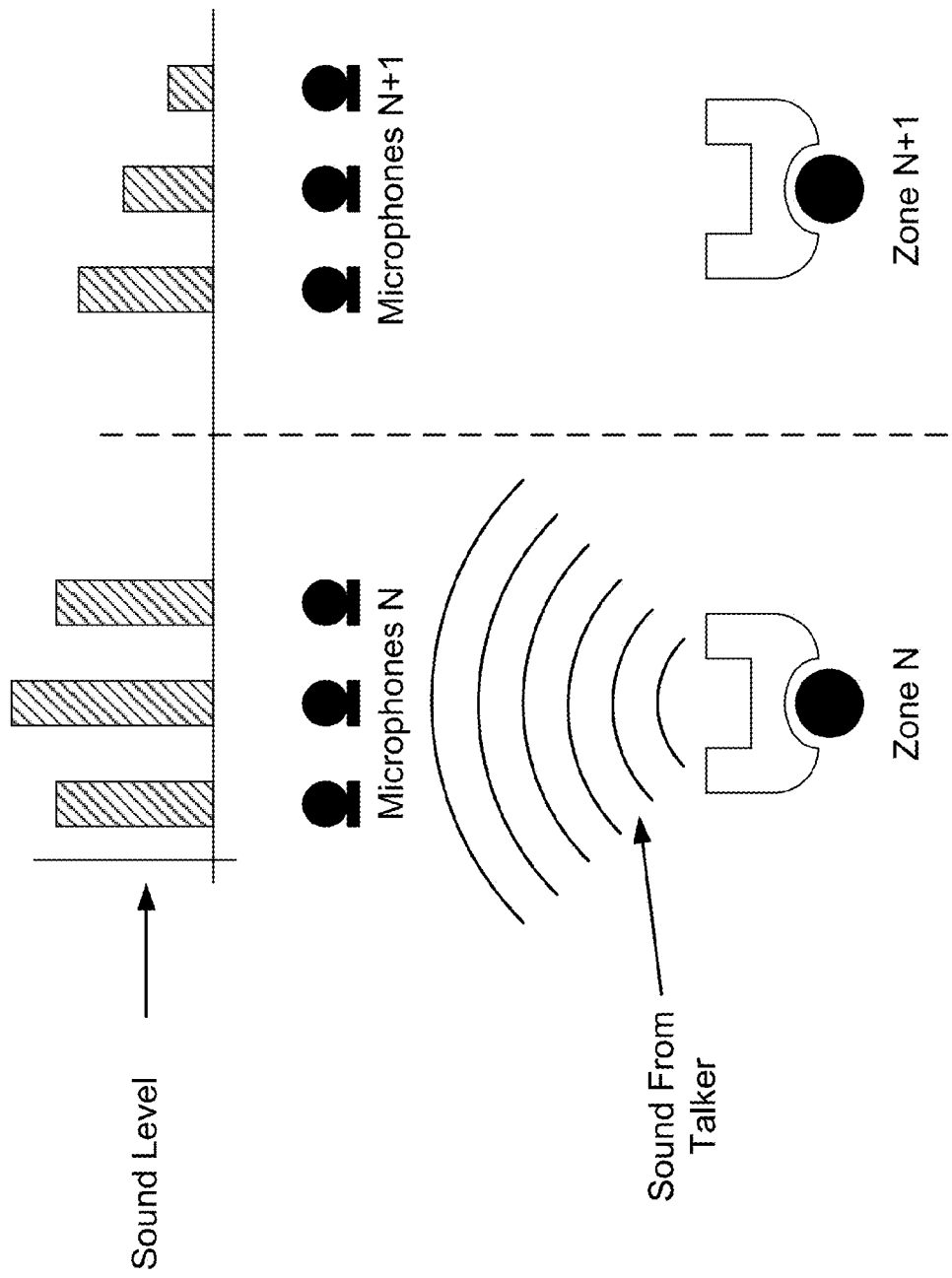
FIG. 4 is a schematic illustration of the system, where the speaker is directing sound to the corresponding array.

FIG. 4 illustrates signal levels of microphones when there is only one talker in Zone N, with no obstacles in the acoustic paths. Relative signal levels of microphones based on microphone distance are estimated statistically according to acoustic characteristics of a typical teleconference room with only one active talker. The result is stored in a relative signal level matrix (RSLM). Separately or at a same time, relative signal levels of microphones with a signal frequency higher than 2000 Hz (e.g., 2 kHz or higher) are estimated statistically according to acoustic characteristics of a typical teleconference room with only one active talker. The result is stored in a relative signal level matrix-high frequency (RSLM-H).

For an ideal room with no reflection/reverberation, and ideal microphones with exactly same gain levels, each of the RSLM and the RSLM-H can be calculated based on distances between the microphones and a talker. When an active talker is in front of one microphone, that microphone has the strongest signal. Signal strength received by other microphones depends on the distance between the talker and the microphone (inverse proportional to square of the distance). The distance between the talker and the other microphones depends on a distance, D, between microphones and a distance, S, between the talker and the microphone in front of him.

For example, an adjacent microphone has a distance equal to $\sqrt{D^2+S^2}$ (i.e., the talker and the two microphones form a right triangle). D is fixed for an array, so the relative signal strength difference between the loudest microphone and the adjacent microphone only depends on S. The signal strength difference becomes smaller when S is bigger (i.e., the relative distance difference is smaller). For a given S, the signal strength of the microphones relative to the loudest microphone is fixed. The signal strength of the adjacent microphone is proportional to $$\frac{1}{D^2 + S^2}.$$

In real systems, table reflection, room acoustics, and the talker talking to the front or side changes the signal strength of microphones relative to loudest microphone. So, RSLM and RSLM-H can be calculated statistically by playing/reproducing a predefined signal from a speaker and capturing microphone signals multiple times to calculate an average and measuring the variance. This can be done as part of a system installation. For systems with a fixed table, microphone array placement, and good room acoustics such as immersive systems, RSLM and RSLM-H can be calculated once in a typical room and used for all systems.

Each of RSLM and RSLM-H assumes all microphones in an array have the same gains. That is not true in real systems. During a system installation, microphone gain calibration is performed by playing out pre-defined signals from a speaker, and collecting microphone signals to calculate microphone gains. Microphone gains are then adjusted based on the result.

In another implementation, a plurality of RSLMs ($RSLM_i$, where i=0, 1, 2, . . . ) can be calculated statistically. Each of these RSLMs can correspond to different frequency ranges, and these ranges can be discrete ranges or can overlap. The ranges can also be different in size. For example, $RSLM_0$ can correspond to a frequency range of less than about 500 Hz, $RSLM_1$ can correspond to a frequency range of about 500 Hz to 2 kHz, and $RSLM_2$ can correspond to a frequency range of greater than about 2 kHz. In another example, a stepwise increase of 100 Hz or 250 Hz can continue from 0 Hz to 2 kHz or more, and a frequency range overlap of 25 Hz or 50 Hz can be utilized. Increasing the number of RSLMs used can increase accuracy at the cost of increasing complexity. However, merely using RSLM and RSLM-H, as discussed herein, has been found to provide adequate performance levels.

When the primary talker and the microphone are in the same zone, signal levels of microphones in other zones are estimated according to a strongest signal level and the RSLM. Actual signal levels of microphones are compared with the estimated levels to decide whether there are other talkers in the room. If microphone signals are within a small range of the estimated levels or lower, then the microphones are determined to be receiving speech signals only from the primary talker. If signal levels of microphones in a zone are significantly higher than the estimated levels, then it is determined that there is a sound source other than primary talker in the zone.

When microphones in a zone with a primary talker are blocked by obstacles or a talker is facing one side, an estimated position of the primary talker may not be in the same zone as the microphone with the strongest signal. When the primary talker and the microphone are not in the same zone, the sound level of the strongest signal is lower than it would be if there were no obstacles in the zone or the talker was not facing to one side. Since the microphone with the strongest signal level is not closest to the primary talker in this case, the strongest signal level used to estimate signal levels of other microphones is scaled up according to a distance between the primary microphone and the talker.

When the zone with the primary talker is muted, signals of all other microphones are attenuated to remove the speech signal from the talker. If the actual signal level of a microphone is within a small margin of the estimated level or lower, then microphone signals are suppressed to avoid leakage of the muted speech. If the actual signal level is significantly higher than estimated level, then it is determined that this indicates the presence of a secondary sound source. Attenuation is then adjusted so that the secondary sound can be heard while the signal of the primary talker is suppressed.

Figure 5:
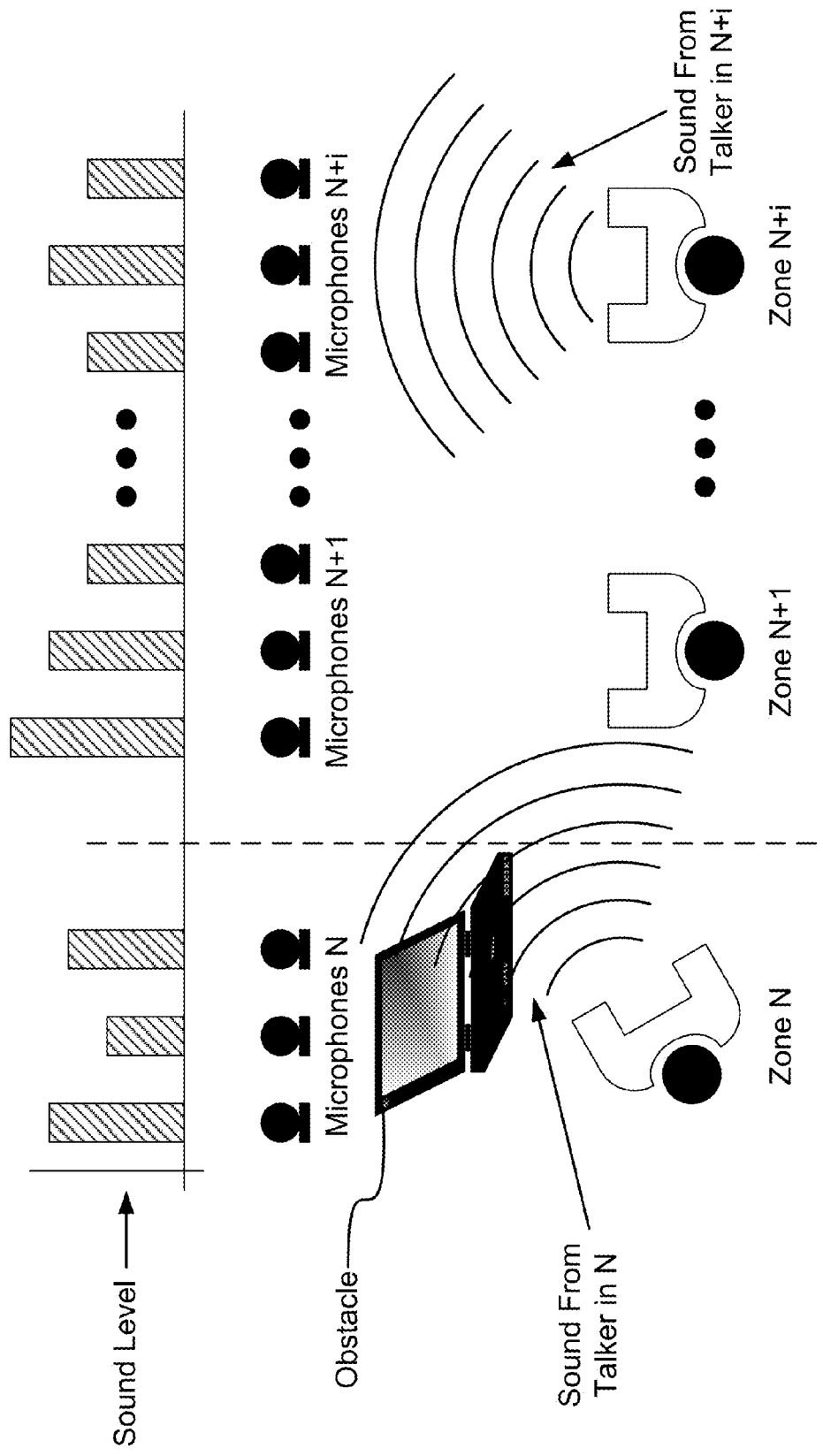
FIG. 5 is a schematic illustration of the system, where the obstacle is present between the speaker and the corresponding array, the speaker is directing sound to a side of the corresponding array, towards the adjacent array, and another primary speaker is directing sound directly at a primary array.

FIG. 5 illustrates a primary talker in a muted Zone N and a secondary talker in an unmuted Zone N+i. In this example, Zone N and Zone N+1 are adjacent zones. Zone N+i can be, but can also not be, adjacent to Zone N and/or Zone N+1. That is, zones can separate Zone N+1 and N+i.

The microphones in Zone N are at least partially blocked by an obstacle (e.g., a laptop), such that sound form the talker in N is partially obstructed. A microphone with a strongest signal level is in Zone N+1. The strongest signal level is scaled up to compensate for the signal level drop due to blocking. The adjusted signal level and RSLM is used to estimate signal levels of the other microphones. Since the microphones in Zone N+i also receive a signal from the secondary talker, the actual signal levels will be higher than the estimated levels. Part of the signal from the primary talker will be masked by the signal from secondary talker. Attenuation is adjusted based on a difference between the actual and estimated signal levels. The attenuation is inversely proportional to the difference so that the secondary talker is heard while the primary talker is muted.

Figure 6:
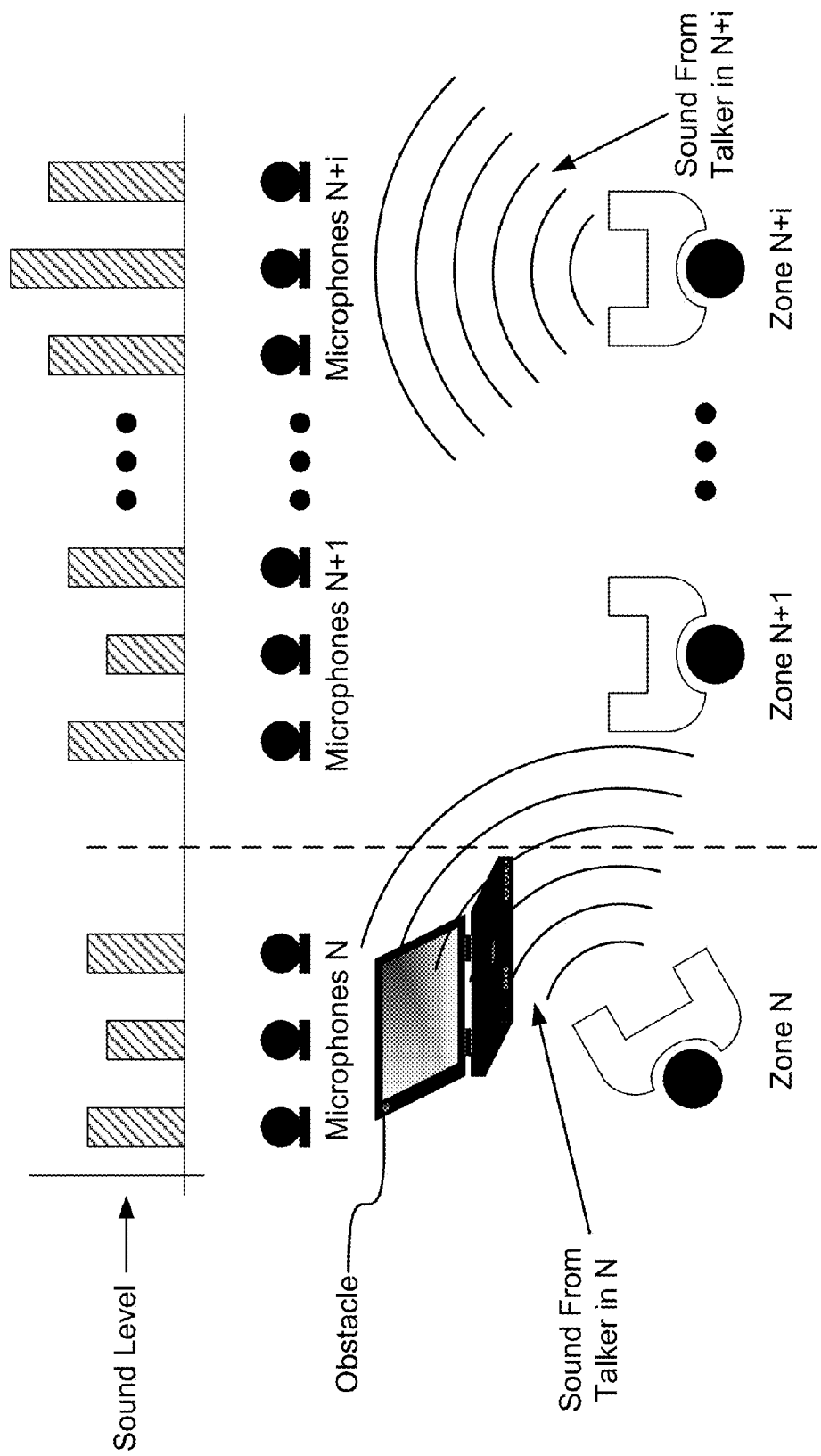
FIG. 6 is a schematic illustration of the system, where a mute/unmute status or a primary speaker role is different as compared to that illustrated in FIG. 5.

FIG. 6 illustrates a secondary talker in a muted Zone N and a primary talker in an unmuted Zone N+i. There are no acoustic obstacles in front of the primary talker, so the microphone with the strongest signal is in Zone N+i. Microphones in Zone N are blocked by a laptop. The microphone with the strongest signal also receives a noticeable speech signal from the secondary talker that should be muted.

To calculate how much signal is leaked into a primary microphone, an actual signal level of the secondary talker is estimated. The signal level of the primary talker and the RSLM are used to estimate a signal level of the microphones in the muted zone. The difference between the actual and the estimated signal levels in the muted zone is the actual signal level of the secondary talker. The actual signal level of the secondary talker and the RSLM are used to estimate a signal level in the primary microphone due to the signal from the muted secondary talker.

Attenuation is applied to the primary microphone signal according to the estimated signal level to prevent a muted speech signal from leaking to remote sites. Microphone processing detects whether there are obstacles blocking microphones in the muted zone. If there are obstacles in the muted zone, then the estimated actual signal level of the secondary talker is scaled up to compensate for the signal level due to blocking.

In a system, such as a telepresence or conference system, generally all of the microphones of the system receive speech signals from a talker through different acoustic paths. To mute speech originating from one specific zone of a meeting room without muting talkers in other zones, signals of all microphones are processed to prevent the speech from leaking to a remote site. There are at least two ways to remove the speech from the microphone signals. One is to use an adaptive filter to cancel the sound from the microphone signals, and another is to suppress the microphone signals.

In one implementation of this disclosure, sound is suppressed to mute sound originating from a specific zone. To mute a speech signal originating from one zone, signals of microphones in other zones are attenuated when there is a talker in the muted zone. The attenuation is performed by control circuitry that receives the microphone signals and codes the microphone signals with, e.g., video data or other data, where coded data can be sent to a remote site for conferencing purposes. Speech signals from talkers outside of a muted zone (S) mask a signal from a talker in the muted zone (Sm). Attenuation for each microphone is calculated based on a power of the signal from the talker in the muted zone (Sm) and a mask effect of the signal from the talkers outside of the muted zone (S).

To estimate how much attenuation is necessary for each microphone, the following exemplary algorithm is executed.
1) Estimate location of the primary talker.
2) Determine whether there is an active talker in the muted zone.
3) Estimate microphone signal components due to the talker in the muted zone.
4) Estimate microphone signal components due to talkers that are not in the muted zone.
5) Adjust the signal components estimation when there are acoustic obstacles such as laptops, tablets, user interface devices, etc.

Specifically, in an exemplary implementation, the following exemplary algorithm is executed, which includes aspects of calibrating a system.
1) Measure a relative signal strength of each microphone when there is only one active talker and no acoustic obstacles. This can be done as part of system calibration when the audio system is installed. The result is stored in a relative signal level matrix (RSLM). This can be considered calibration data.
2) Find a location of the primary talker with the presence of acoustic obstacles by using a sound-source location algorithm that is robust.
3) Determine a microphone with highest signal strength and compare its position with the estimated sound location by the sound-source location algorithm.
4) If the position of the microphone with the strongest signal matches the estimated sound location, then it is determined the microphone is not affected by acoustic obstacles. Then, the RSLM is used to estimate the signal strength of other microphones due to the primary talker.
5) If the position of the microphone with the strongest signal doesn't match the estimated sound location, then the microphone is affected by sound obstacles or the talker is facing away from the microphone. In this case, the signal strength is lower than it should be, and to compensate for the loss, the signal strength of the microphone is adjusted. An amount of adjustment depends on a distance between estimated sound location and the microphone position, such that the bigger the distance, the larger the adjustment. The adjusted signal strength and the RSLM are then used to estimate the signal strength of the other microphones due to the primary talker.
6) Compare the estimated and actual signal strengths for each microphone. A significantly higher actual signal strength than estimated is determined as indicating that there is another talker close to the microphone.
7) In the case where primary talker is in a muted zone, and there are other talkers in the unmuted zone, signals of microphones in the unmuted zone are attenuated to suppress a speech signal from the muted talker. A difference between the actual and the estimated signal strength is determined as being the result of the unmuted talker. The signal from the unmuted talker is also determined as masking the signal from the muted talker. The attenuation that is applied depends on the mask effect and estimated signal strength of the muted talker.
8) A likely scenario in one implementation is where the primary talker is in an unmuted zone and another talker is in a muted zone. Talkers in muted zone usually tend to talk low so that the meeting won't be disturbed. An adjusted signal strength of the loudest microphone and the RSLM are used to estimate signal strength of microphones in muted zone. A difference between the actual and the estimated signal strength in muted zone is the result of the muted talker. The difference and the RSLM are used to estimate the signal strength received from the muted talker on microphones in unmuted zone. The microphones in unmuted zones are attenuated, and the attenuation depends on mask effects of the signal of the unmuted talker and on the estimated signal from the muted talker.

The above descriptions provide for advantageous effects over conventional technology, in that sound cancellation using an adaptive filter and blind sound separation both have residuals of a muted signal, which may leak to a remote site and neither method works under a complicated acoustic environment, such as where a microphone may be blocked by acoustic obstacles or a talker facing away from microphones, and the teachings of this disclosure address these issues.

Specifically, according to aspects of this disclosure, speech signal suppression is utilized to perform sound source muting, and this practical approach works reliably in complicated acoustic environments.

An exemplary sound-source location algorithm can utilize face-recognition through imaging and image processing.

Audio-source tracking algorithms, which can also be utilized or used in combination with face-recognition and image processing, are also discussed in US Patent Application Publication No. 2008/0174665 (U.S. application Ser. No. 11/966,773, filed Dec. 28, 2007), which is incorporated herein by reference. The teachings of US Patent Application Publication No. 2008/0174665 can be incorporated to the teachings of this disclosure in implementing a source-tracking algorithm. Other source-tracking algorithms can also be used.

When there are obstacles between a talker and microphone, sound signals with different frequencies will be affected differently. For a normal conference room, sound with a frequency below 500 Hz acts more like a wave while sound with a frequency higher than 2000 Hz acts more like light. Typical sizes of laptops, tablets, and user interface devices are larger than one wavelength of a sound signal with a frequency above 2000 Hz. Accordingly, a sound signal with a frequency higher than 2000 Hz will be blocked by the obstacles.

When there are obstacles between a talker and a microphone, the signal strength received by the microphone will be much lower than those microphones that are not blocked. With an array of microphones on a table, it is not possible or at least very unlikely that all microphones are blocked by the obstacles in a normal meeting. When there are obstacles on the table, for sound signals with a frequency higher than 2000 Hz, unblocked microphones will have much higher signal strength. The signal strength difference depends on size and position of obstacles. The positions of obstacles can be estimated by comparing the high frequency signal strengths of microphones with RSLM-H.

Accordingly, high-frequency signals can be used to identify a location of sound obstacles by comparing signal amplitude levels from several microphones across several frequency ranges.

Acoustic obstacles can also be tracked by cameras and corresponding image-processing circuitry to segment images from the cameras to identify obstacles that are provided between a microphone array, which can be fixed to a table, e.g., and speakers. Further, face-recognition algorithms can be executed to identify active speakers.

As to obtaining a match or a threshold amount of similarity between the reference matrix and the current/live sound level pattern, various techniques can be applied. For example, the current/live sound level pattern can be normalized so that a maximum sound level in the current/live sound level pattern is the same as that of reference patterns in the reference matrix. Then, a best-fit algorithm can be executed to compare the current/live sound level pattern to one or more of the reference patterns. Also, the current/live sound level pattern can be transformed into a linear function, where an X-axis corresponds to channel number and a Y-axis corresponds to a normalized sound level. The linear function can then be compared to corresponding linear functions of the reference patterns, and values can be compared amongst various comparisons of the linear function to those of the reference patterns, and a best-fit reference pattern can be identified and utilized for determining whether the be best-fit reference pattern corresponds to an obstacle by, e.g., a corresponding look-up table stored by the control circuitry. Furthermore, the current/live sound level pattern can be transformed into a vector, where the reference patterns in the reference matrix can also be stored as vectors, and cosine similarity can be executed as an algorithm. A best-fitting combination can then be identified and utilized to determine whether an obstacle is present.

Figure 7:
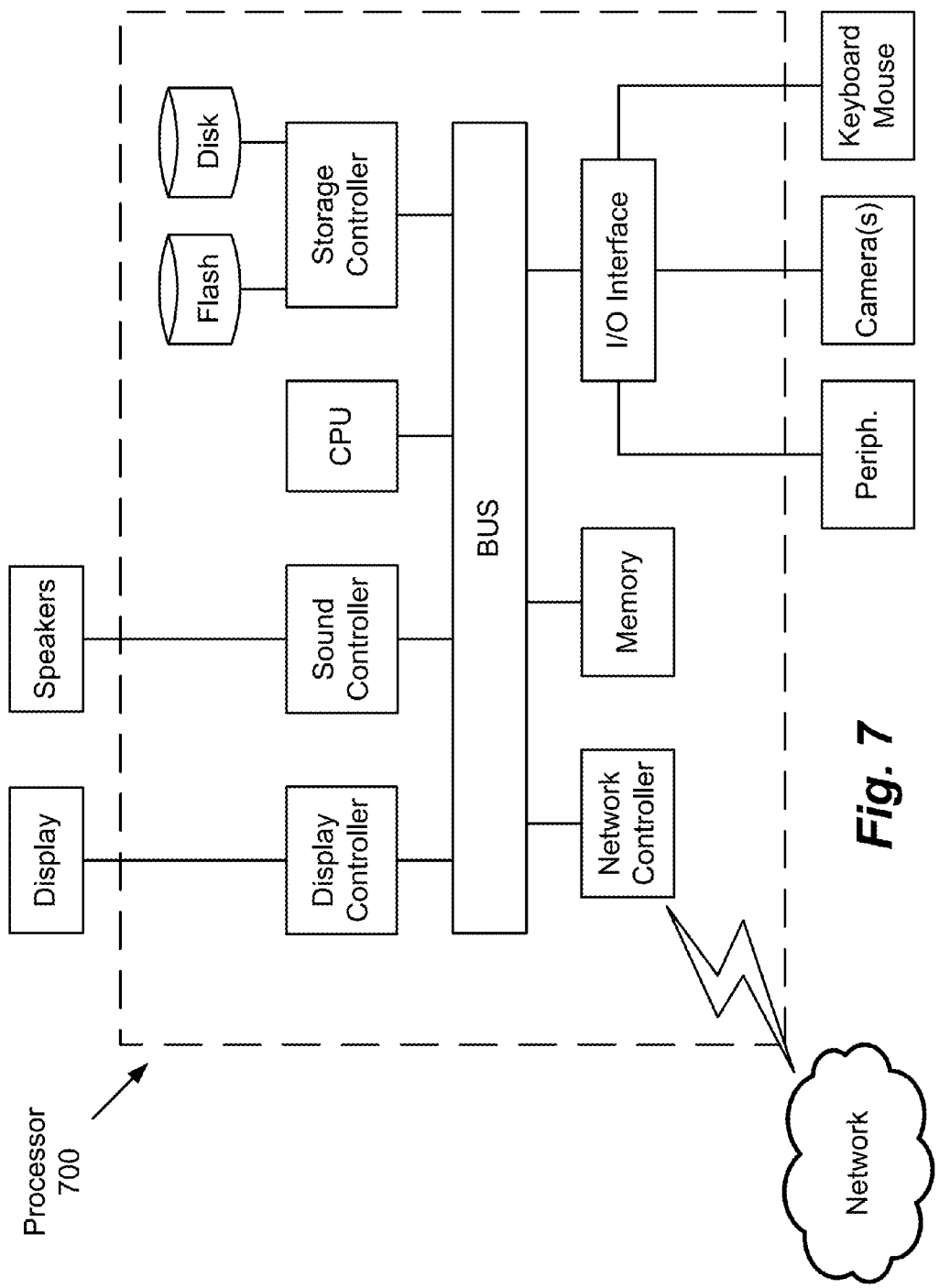
FIG. 7 is a schematic illustration of a processor.
Figure 8:
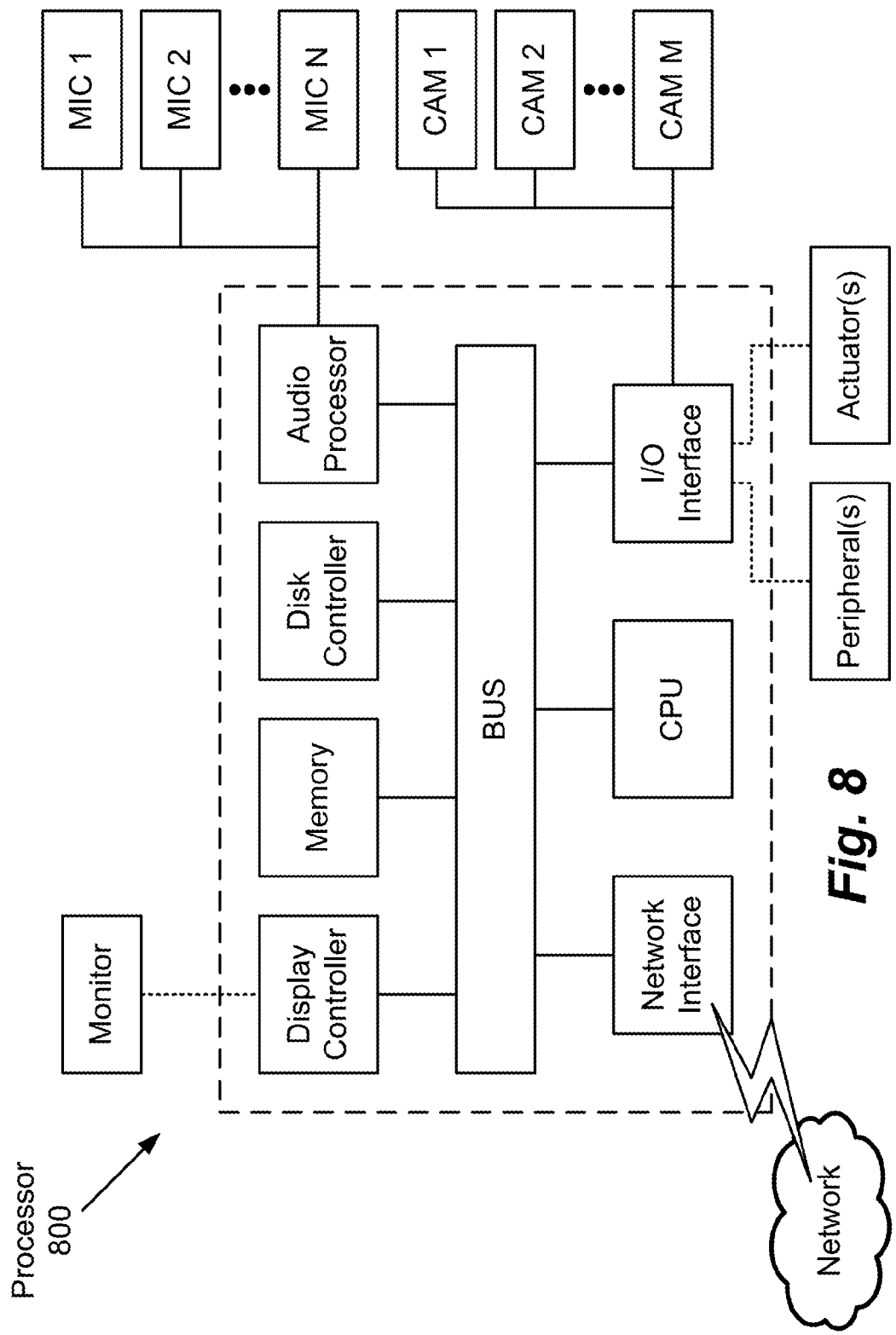
FIG. 8 is a schematic illustration of another processor.

Each of FIGS. 7 and 8 illustrates an exemplary processing system or processor 700/800. One or more of such processors can be utilized in or to execute one or more algorithms, or portions thereof, or one or more architecture blocks, or portions thereof, in accordance with the descriptions provided herein. For example, these processors illustrate computerized systems or circuits that implement the various algorithms and functions described herein. However, exemplary implementations may not include all of the hardware structures illustrated in these figures, as corresponding function may not be desired in all implementations.

The exemplary processor or processors described herein can be implemented in or by a videoconferencing endpoint, which can also be referred to as a terminal or a telepresence terminal. The exemplary processor or processors described herein can also be implemented in or by a multipoint control unit. A telepresence processing system can include one or more of the exemplary processors describe herein, and specifically can include one or more telepresence terminals, one or more multipoint control units, or one or more telepresence terminals and one or more multipoint control units. Further, transmission of data to a remote site can involve one endpoint transmitting data to a second endpoint. A multipoint control unit may be provided functionally or on a physical network between the first and second endpoints and perform at least portions of the processing described herein.

The exemplary processors can be implemented using one or more microprocessors or the equivalent, such as a central processing unit (CPU), at least one application specific processor ASP (not shown), circuitry and/or one or more other circuits. The microprocessor is a circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can control a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

In FIG. 7, processor 700 can be embodied, in an exemplary implantation by a computer system of conventional hardware architecture that has been modified by programming to execute the algorithms described herein. The processor 800 of FIG. 8 can be similarly embodied.

In one implementation, the processor 700 is separate from the processor 800. In another implementation, the processors 700 and 800 are integrated into a single machine. Further, aspects of the processors 700 and 800 can be distributed among a plurality of networked computer hardware components or circuits. In FIG. 8, the processor 800 is illustrated as connected to a plurality of microphones and cameras. These microphones can be grouped into two sets: one for audio tracking purposes to provide an audio tracking microphone array; and another for audio communication purposes to provide audio communication microphones, thereby provides respective far-end and near-end audio sources. Although one audio processor is illustrated in FIG. 8, multiple audio processors can be provided, such as one or one group of processors dedicated for audio tracking and one or one group of processors dedicated for audio communication purposes. Separate processors can also be provided for each of a plurality of microphone arrays for primary communication purposes.

Figure 9:
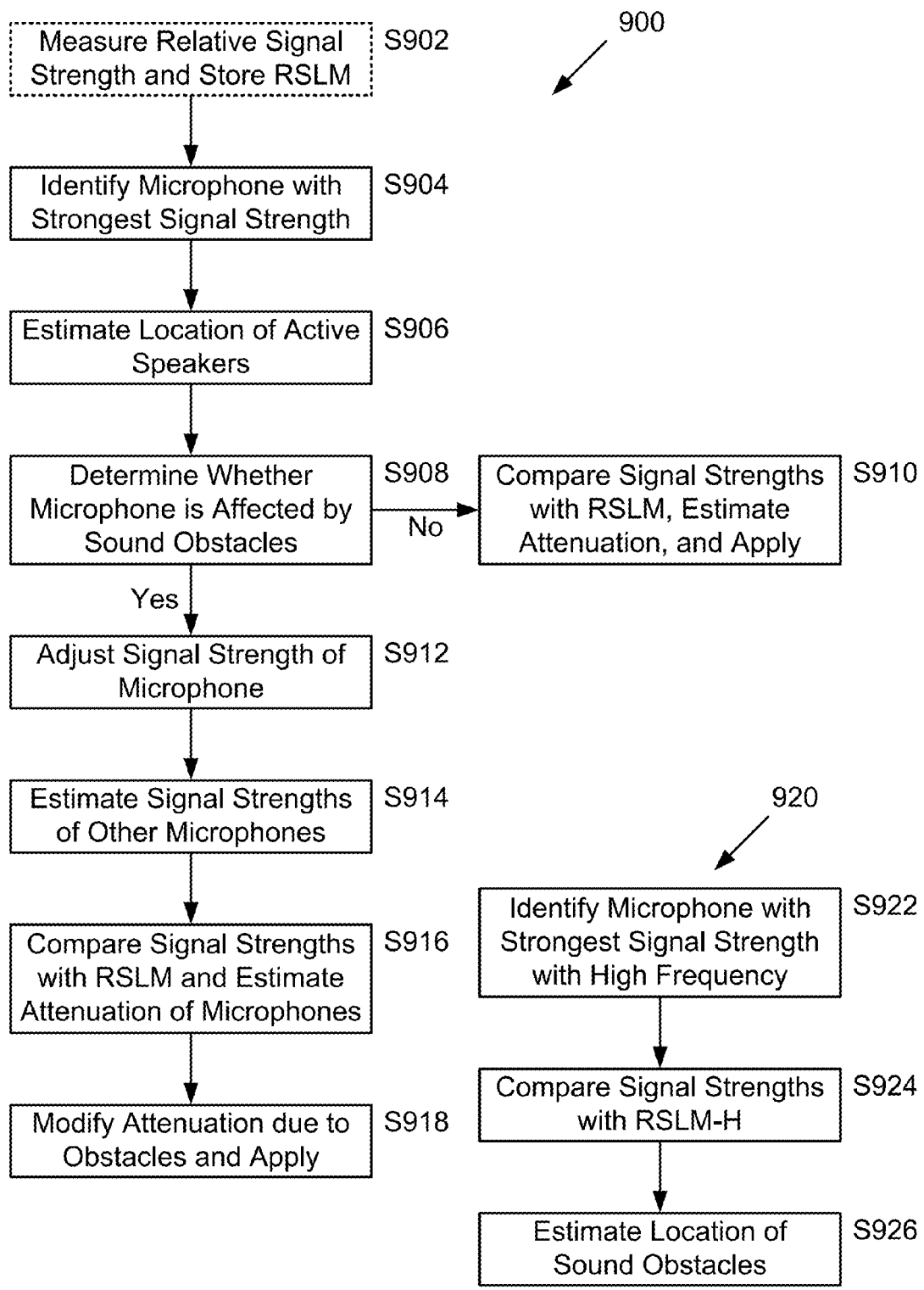
FIG. 9 is a flowchart illustration of an exemplary algorithm.

FIG. 9 illustrates an exemplary algorithm 900 for applying attenuation to microphones in one or more unmuted zones by a processor or circuitry, by way of a flow chart, that corresponds to the processing and hardware described via one or more of the exemplary processors illustrated in FIGS. 7-8. FIG. 9 also illustrates an exemplary algorithm 920 for estimating a location of sound obstacles.

In FIG. 9, one or more processors or circuitry (e.g., codecs, control circuitry, signal processors, etc.) measure relative signal strengths of microphone signals from an identified source (e.g., a single active speaker) at S902 and a corresponding RSLM is stored. This process can be included in a calibration of a processing system or conducted off-site in test-facility, and the RSLM can thereby be provided as a reference calibration indirectly. Thus, S902 can be omitted if an RSLM is already available or provided.

At S904, a microphone amongst a plurality of microphones is determined and identified as having the strongest signal strength. This can be determined regardless of frequency. That is, this determination can be made for an overall signal strength that takes into account all frequencies. At S906, a location of one or more active speakers is estimated. Here, a sound-source location algorithm or a source-tracking algorithm can be utilized. S904 and S906 can be reversed in order or executed at the same time.

Based on the estimated location of one or more active speakers from S906 and a location of the microphone with the strongest signal strength, a determination is made as to whether the microphone with the strongest signal strength is affected by sound obstacles. This can be determined by control circuitry determining that the position of the microphone with the strongest signal strength matches the estimated location of the one or more active speakers, which results in the control circuitry determining that the microphone with the strongest signal strength is not affected by acoustic obstacles. Then, with the determination "No," the signal strengths of the microphone signals of the microphones are compared with the RSLM, attenuation is estimated, and the estimated attenuation is applied to the microphone signals at S910. After the attenuation is applied, the algorithm can return to S904, and the pertinent steps of the algorithm can be periodically repeated.

On the other hand, when the control circuitry determines that the position of the microphone with the strongest signal strength does not match the estimated location of the one or more active speakers, the control circuitry determines that the microphone with the strongest signal strength is affected by acoustic obstacles. Then, with the determination "Yes," the signal strength of the microphone that corresponds to the location of the one or more active speakers (i.e., the microphone in a zone that coincides with an active speaker that is unmuted) can be adjusted at S912 so that the signal strength of this microphone is increased to compensate for the loss due to the acoustic obstacle.

At S914, the signal strengths of the other microphones are estimated based on the RSLM and the adjusted signal strength. At S916, these estimated signal strengths are compared to actual signal strengths for each microphone. Higher actual signal strengths (e.g., at least 5%, 10%, 15%, 20%, 25%, 30%, 35%, 40%, 45%, 50%, 100%, or any intervening values higher than the estimated signal strengths) indicate that there is another talker close to the microphone in question. When an active talker is in a muted zone, and there are other talkers in an unmuted zone, signals of microphones in the unmuted zone are attenuated to suppress a speech signal from the muted talker. A difference between the actual and the estimated signal strength is determined as being the result of the unmuted talker. The signal from the unmuted talker is also determined as masking the signal from the muted talker. The attenuation that is applied depends on the mask effect and estimated signal strength of the muted talker. Based thereon, attenuation of the microphones is estimated at S916.

At S918, the estimated attenuation is modified to account for obstacles, and applied to the microphone signals. After the attenuation is applied, the algorithm can return to S904, and the pertinent steps of the algorithm can be periodically repeated.

The obstacles are detected in accordance with algorithm 920. At S922, a microphone with a strongest signal strength with a high frequency is identified. A high frequency is a frequency of about 2000 Hz or more, or a frequency that is identified as being blocked by obstacles of interest. For example, according to the teachings of this disclosure, the obstacles of interest (e.g., acoustic obstacles) have been identified as blocking sound of a frequency higher than 2000 Hz, but this value can be changed to reflect different types of obstacles. Accordingly, a high-frequency threshold can be set to 2000 Hz+/−1, 2, 5, 10, 25% (and intervening values).

Further, S922 can be executed at a same time or as part of a same process as S904 and/or S906. For example, circuitry can identify a microphone with the strongest overall signal strength, and then identify a microphone with the strongest signal strength with respect to the high-frequency threshold noted above, or vice versa. In implementing aspects of S922, the circuitry can transform the corresponding audio signals into the frequency domain to compare values for frequency ranges above the high-frequency threshold of one microphone with corresponding values of other microphones to determine which microphone has the strongest signal strength with high frequency. Similar to executing S906 and S922, the following steps S924 and S926 can also be executed at the same time or as part of a same process as one or more of S904, S906, S908, S912, S914, and S916. That is, the relative order between these steps illustrated in FIG. 9 is not limiting, and merely an exemplary implementation. Parallel and/or sequential processing techniques can be applied. Also, in some cases, the algorithm 920 is only executed in response to S908 resulting in a "Yes" determination that a microphone is affected by sound obstacles as a result of outputs of S904 and S906.

At S924, the signal strengths of the microphones (e.g., all of the microphones) is compared with RSLM-H, and a location of sound obstacles is estimated at S926. From the estimated sound obstacles and the estimated attenuation for microphones in the one or more unmuted zones, the estimated attenuation is modified due to the obstacles (i.e., the estimated location of the obstacles) at S918. Also at S920, the modified attenuation is applied to the microphones in the one or more unmuted zones.

The algorithms 900 and 920, or at least portions thereof, can be repeated periodically (e.g., several times a given period of time) based on processing resources to effectively change the attenuation applied to the microphones in the one or more unmuted zones regularly. Thus, the attenuation can be updated to reflect current conditions regularly. Also, portions of these algorithms can be omitted in some implementations.

Microphone signals, as attenuated by the above-discussed modified attenuation, can be coded in a telepresence call and output to remote terminals, a multipoint control unit, and/or a recorder (for, e.g., viewing the call in non-real-time). These attenuated microphone signals can be packaged with corresponding video packets and/or corresponding data packets that represent additional components of the call, including data files such as documents, presentations, and/or other visual aids.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A processor, comprising circuitry configured to:
    identify a first microphone, from a plurality of microphones, that has a strongest signal strength;
    estimate a location of an active speaker;
    determine whether a second microphone, of the plurality of microphones, for the active speaker is affected by an acoustic obstacle based on the location of the active speaker and a location of the first microphone that has the strongest signal strength;
    estimate attenuation for the first microphone based on a comparison of actual signal strength of the second microphone with estimated signal strength of the second microphone, wherein the estimated signal strength is estimated based on microphone signals of the second microphone for the active speaker; and
    modify the attenuation based on an estimated location of the acoustic obstacle.

2. The processor according to claim 1, wherein the circuitry is further configured to:
    identify a microphone, from the microphones, that has a strongest signal strength at a high frequency; and
    estimate the location of the acoustic obstacle based on a comparison of signal strengths of the microphones at the high frequency with a high-frequency reference calibration of the microphones with an active speaker at the high frequency.

3. The processor according to claim 2, wherein the circuitry is configured to estimate the estimated signal strengths based on the microphone signals at a full-range of frequencies of the second microphone for the active speaker and a full-range reference calibration of the microphones with an active speaker at the full-range of frequencies.

4. The processor according to claim 3, wherein the full-range reference calibration is a relative signal level matrix (RSLM) that stores relative signal levels of the microphones with an active speaker at the full-range of frequencies.

5. The processor according to claim 4, wherein the circuitry is configured to generate the RSLM by measuring relative signal strengths of the microphones at the full-range of frequencies with one or more known active speakers without obstacles and store the RSLM in a memory.

6. The processor according to claim 5, wherein the relative signal levels of the microphones of the RSLM are based on microphone distances and are estimated by the circuitry statistically according to acoustic characteristics of an environment that includes the microphones and only one active speaker.

7. The processor according to claim 2, wherein the high-frequency reference calibration of the microphones with an active speaker is a relative signal level matrix—high frequency (RSLM-H) that stores relative signal levels of the microphones with an active speaker at the high frequency.

8. The processor according to claim 7, wherein the relative signal levels of the microphones of the RSLM-H are estimated by the circuitry statistically according to acoustic characteristics of an environment that includes the microphones and only one active speaker.

9. The processor according to claim 7, wherein the circuitry is configured to generate the RSLM-H by measuring relative signal strengths of the microphones at the high frequency with one or more known active speakers without obstacles and store the RSLM-H in a memory.

10. The processor according to claim 2, wherein the high frequency is about 2 kHz or higher.

11. The processor according to claim 1, wherein the circuitry is further configured to determine whether the active speaker is in a muted zone, and estimate the attenuation based on whether the active speaker is in the muted zone.

12. The processor according to claim 1, wherein the circuitry is further configured to apply the modified attenuation to microphone signals of one or more of the microphones in one or more unmuted zones.

13. The processor according to claim 12, wherein the circuitry is further configured to package audio signals based on the microphone signals after the modified attenuation has been applied and transmit the packaged audio signals to a remote device.

14. The processor according to claim 1, wherein the circuitry is further configured to:
package audio signals based on microphone signals of one or more of the microphones in one or more unmuted zones,
separately package attenuation data with data corresponding to the modified attenuation, and
transmit the packaged audio signals and the separately packaged attenuation data to a remote device.

15. The processor according to claim 1, wherein the circuitry is further configured to:
receive images from one or more cameras;
identify the acoustic obstacle in the images; and
generate the estimated location of the acoustic obstacle from the images.

16. A telepresence processing system, comprising:
one or more tracking microphone arrays,
audio-tracking circuitry configured to detect a location of audio sources from audio signals from the one or more tracking microphone arrays, and
processing circuitry configured to:
identify a first microphone, from a plurality of microphones, that has a strongest signal strength;
estimate a location of an active speaker based on at least an output of the audio-tracking circuitry;
determine whether a second microphone, of the plurality of microphones, for the active speaker is affected by an acoustic obstacle based on the location of the active speaker and a location of the first microphone that has the strongest signal strength;
estimate attenuation for the first microphone based on a comparison of actual signal strength of the second microphone with estimated signal strength of the second microphone, wherein the estimated signal strength is estimated based on microphone signals of the second microphone for the active speaker; and
modify the attenuation based on an estimated location of the acoustic obstacle.

17. The processing system according to claim 16, further comprising:
a network transmitter, wherein
the processing circuitry is configured to apply the modified attenuation to microphone signals of one or more of the microphones in one or more unmuted zones, and package audio signals based on the microphone signals after the modified attenuation has been applied, and
the network transmitter is configured to transmit the packaged audio signals to a remote device.

18. The processing system according to claim 16, further comprising:
one or more cameras to capture video of at least the active speaker, wherein
the processing circuitry is configured to package video signals based on an output of the one or more cameras, and
the network transmitter is configured to transmit the packaged video signals with the packaged audio signals to a remote device.

19. A method, comprising:
identifying, by circuitry, a first microphone, from a plurality of microphones, that has a strongest signal strength;
estimating, by circuitry, a location of an active speaker;
determining, by circuitry, whether a second microphone, of the plurality of microphones, for the active speaker is affected by an acoustic obstacle based on the location of the active speaker and a location of the first microphone that has the strongest signal strength;
estimating, by circuitry, attenuation for the first microphone based on a comparison of actual signal strength of the second microphone with estimated signal strength of the second microphone, wherein the estimated signal strength is estimated based on microphone signals of the second microphone for the active speaker; and
modifying, by circuitry, the attenuation based on an estimated location of the acoustic obstacle.

\* \* \* \* \*